June 27, 1961  A. L. LEACH  2,990,192
LOG BUNK
Filed March 2, 1959  2 Sheets-Sheet 1
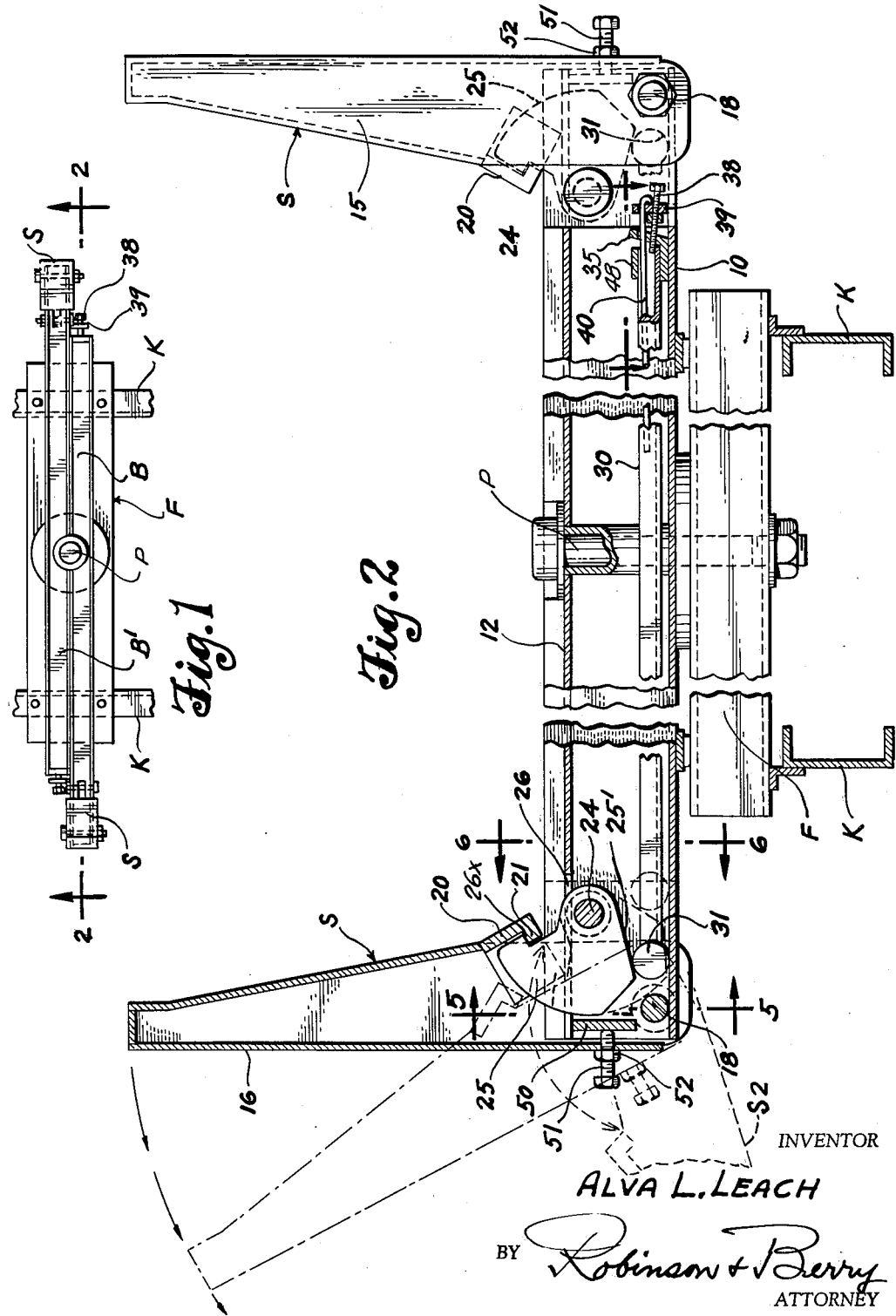
INVENTOR
ALVA L. LEACH
BY Robinson + Berry
ATTORNEY June 27, 1961   A. L. LEACH   2,990,192
LOG BUNK
Filed March 2, 1959   2 Sheets-Sheet 2
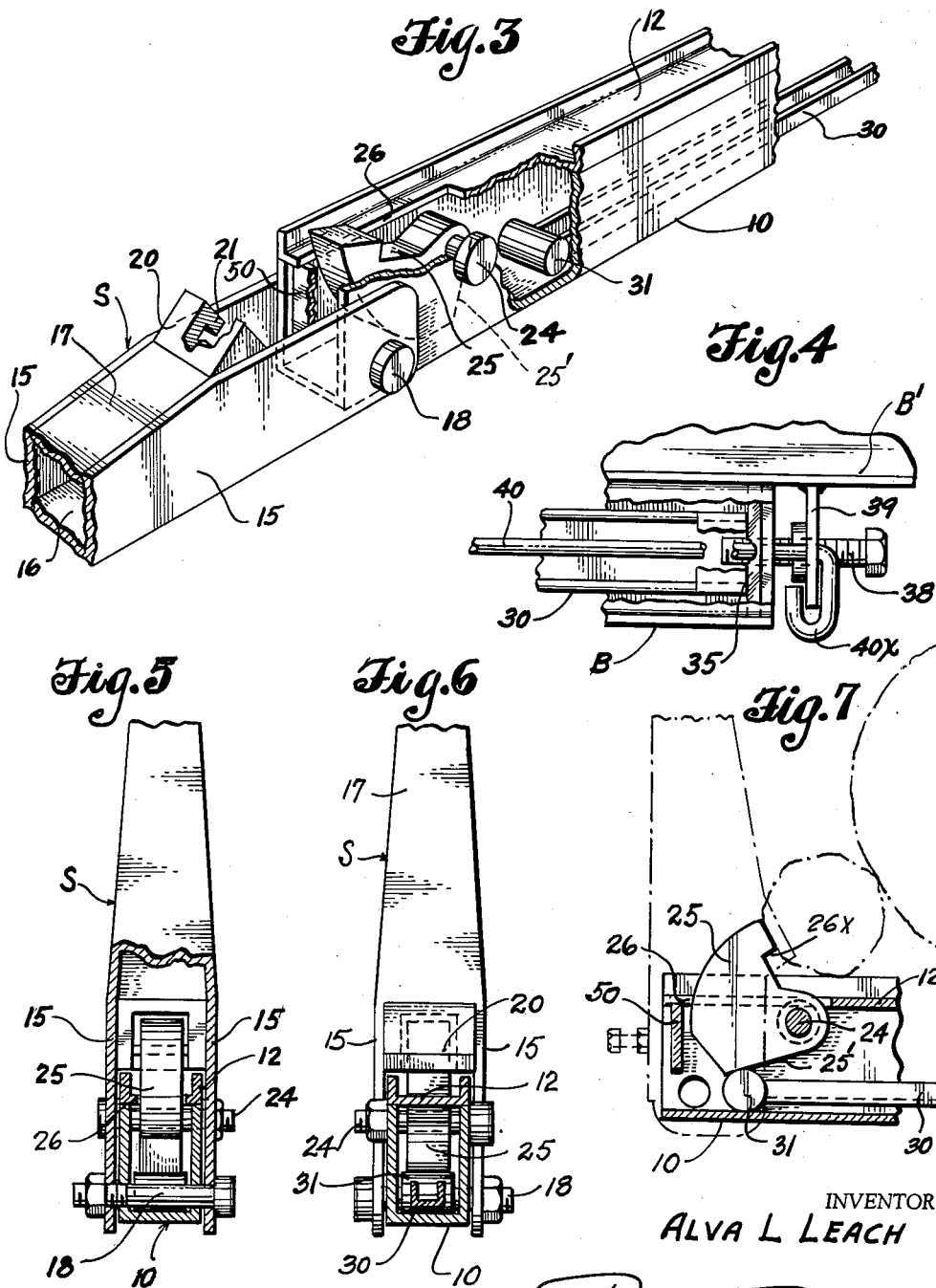
INVENTOR
ALVA L LEACH
BY Robinson & Berry
ATTORNEY United States Patent Office 2,990,192
Patented June 27, 1961

2,990,192
LOG BUNK
Alva L. Leach, 517 Commercial St., Raymond, Wash.
Filed Mar. 2, 1959, Ser. No. 796,306
6 Claims. (Cl. 280—145)

This invention relates to log bunks and more particularly to improvements in bunks as used for the retaining of logs, or the like, for transportation on trucks, trailers, railway cars and other forms of load transporting vehicles.

It is usually the case that log transporting vehicles, which will hereinafter be referred to as trucks, are equipped with transversely directed bunks, provided at their ends with log retaining stakes; each of these stakes being normally held in upright, log retaining positions by means that is releasable from the opposite end of the bunk thus to permit the stake to swing outwardly and the logs to be unloaded from the truck.

It is the principal object of this invention to provide an improved form of bunk of the above character having a log retaining stake pivoted at one end thereof, and with which bunk a simplified, easily operated, and positive means is associated for the secure locking of the stake in its normal log retaining position, and locking means is releasable for unloading the logs from that end of the bunk opposite that which carries the stake.

It is also an object of this invention to provide a log bunk of improved design and construction; of tubular form and protectively containing the stake latching, locking and releasing parts therein, and which bunk has an unobtruded interior that permits easy washing out of foreign material that may collect therein during the log loading and hauling operations.

It is also an object of this invention to provide a log bunk that is equipped with an end stake that is pivoted to swing between an upright holding and a downwardly inclined, released position, and a pivoted latch in the bunk that is movable from released to locking position by a rod that extends lengthwise of and within the hollow bunk, and which rod has a latch engaging head at one end and is adapted to be engaged at its opposite end with and secured in latch holding position against a stop an abutment located in the bunk end which is opposite that carrying the stake.

Further objects of the present invention reside in the provision of cooperatively associated cross-bunks whereby log retaining stakes are disposed in paired relationship at opposite sides of the truck; in the joining of the paired and cooperatively associated bunks and in their pivotal mounting on the logging vehicle.

Further objects and advantages reside in the various details of construction of parts; in their assembled relationship and in their mode of use, as will hereinafter be fully described.

In accomplishing the above mentioned and other objects and advantages of the invention, I have provided the improved details of construction, the preferred forms of which are illustrated in the accompanying drawings, wherein:

FIG. 1 is a top or plan view at a reduced scale, showing paired bunks of the present invention as cooperatively assembled and as mounted for use on the supporting frame of a logging truck.

FIG. 2 is a transverse, vertical section through the frame structure of a logging truck as equipped with cooperatively related log bunks embodying the improvements of the present invention therein; the near bunk and the stake at its end being shown in longitudinal section, as taken on line 2—2 in FIG. 2.

FIG. 3 is a perspective view of the end portion of a bunk and the lower end portion of the stake mounted thereon; parts of the top and sidewall of the bunk being broken away to show the stake latch and the latch setting and releasing bar.

FIG. 4 is a top or plan view of the end portion of the bunk opposite that seen in FIG. 3, particularly illustrating the abutment member against which the latch setting bar engaged for holding it against release.

FIG. 5 is a vertical cross-section of the bunk, taken on line 5—5 in FIG. 2.

FIG. 6 is a vertical cross-section of the bunk as seen on line 6—6 in FIG. 2.

FIG. 7 illustrates use of the stake latch for a log retaining purpose when the stake is dismounted from the bunk.

It will here be explained that this invention anticipates use of bunks of the present type in pairs and cooperatively assembled in the relationship illustrated in FIG. 1. It is there shown that the two bunks, which are designated, respectively, by reference letters B and B' are disposed side by side, and fixedly mounted on the truck transversely thereof, each being equipped at one end only with a log retaining stake S, and these are located at opposite sides of the truck. It is further to be understood by reference to FIG. 1, that the bunks are joined together as a unit, and the unit is pivoted by a vertical king pin P upon a supporting base structure F that is shown, particularly in FIG. 2, to be mounted upon the longitudinal beams K—K of the truck chassis.

It is further to be understood that the paired bunks, B and B', are alike in construction and use, and therefore the description thereof which is applied to the showing of bunk B in FIG. 2, will apply equally to the companion bunk B'.

Referring now more in detail to the drawings: The bunk B is fabricated from an upwardly facing channel beam 10 of such length as to extend across the truck frame and beyond the opposite sides thereof, as has been illustrated in FIG. 2. Ordinarily the channel beam would be approximately seven feet long. When bunks are assembled on pairs as shown in FIG. 1, the total span is approximately eight feet. The width of the channel member 10 is approximately four inches and its depth is approximatly six and one-half inches.

Fixed upon the channel beam 10 and extending to its full length is an upwardly facing channel member 12 which is of the same width as the channel 10 but of substantially lesser depth, as will be noted by reference to their showing in FIGS. 5 and 6. The channel 12 serves as a top closure for the channel member 10, and together they provide a tubular bunk. These two members are securely and permanently joined by welding them together along engaging edges.

Hinged to that end of the bunk which extends farthest from the truck frame, which in FIG. 2 is its left hand end, is a log retaining stake S. Preferably the stake is a metal fabrication of the hollow form shown best in FIGS. 2 and 3 wherein it is seen to comprise laterally spaced opposite face plates 15—15, an outside face plate 16 which extends substantially the full length of the side plates, and an inside plate 17 that terminates at its lower end short of the top level of the bunk when the stake is in upright position. The lower end portions of the opposite side plates 15—15 of the stake are sufficiently spaced as to receive the outer end portion of the bunk B between them as seen in FIG. 3, and a hinge bolt 18 is passed horizontally therethrough and through the opposite side walls of channel member 10 thus to hingedly mount the stake for swinging movement between the upright, log retaining position, and the downwardly directed log releasing position shown, respectively, in full and in dash lines S2 in FIG. 2. The hinge bolt 18 is located in channel 10 close to the end of the bunk and also is close to the bottom wall of the channel so that the outer wall 16 of the stake clears the end of the channel 10 in the swinging of the stake.

Fixed across the stake at the inside, and immediately below the lower edge of plate 17, in an inwardly inclined position is a latch plate 20; this plate being formed at its lower edge with an inturned flange 21 serving a purpose presently explained. Pivotally mounted in the end portion of the hollow bunk by means of a transverse pivot pin 24, that extends horizontally and transversely through the upper portion of the channel 10, is a stake latch 25. This latch is adapted to swing in the central vertical plane of the bunk, upwardly from a lowered position within the bunk, through a longitudinal slot 26 formed in the base of the overlying channel member 12 to a position at which its outer end will holdingly engage as shown in FIG. 2 with the flange 21 of the latch plate 20 as fixed to the stake. The means here provided for actuating the latch 25 from its released to latching position comprises an elongated latch bar 30 that is contained within and extends lengthwise of the channel member 10. At its inner end the bar 30 has a cylindrical head 31 fixed horizontally and transversely thereto and supported for sliding movement on the bottom or base wall of the channel member 10. The opposite or outer end portion of bar 30 extends to and is readily accessible through that open end of the tubular bunk which is opposite the stake carrying end. When the bar 30 is pushed inwardly to its limit, the cylindrical head 31 at its inner end engages with an inclined camming surface 25' of the latch 25, and the latch is caused to be swung upwardly thus to cause a projecting shoulder 26x at its swinging end to pass over and holdingly engage with the flange 21 of the latch plate 20 thus to lock the stake in upright position. The bar 30 may then be held against latch releasing movement by disposing its outer end against the inside surface of an abutment member 35 fixed across the open end of the bunk, as shown best in FIG. 2.

When the latch bar 30 is thus disposed in its latch holding position by the abutment of its outer end against member 35, it can be secured against any possible accidental displacement by a bolt 38 that is threaded through a cross-bar 39 and passes through a hole in the abutment member 35 to cause its inner end to overlap with the outer end portion of the latch bar 30 as shown in FIGS. 2 and 4. It is shown in FIG. 4 that the cross bar 39 is welded to the adjacent sidewall of the bunk B' as extended beyond the end of bunk B.

When it is desired to release the latch bar 30 for that outward movement required for disengaging the head 31 at its inner end from the latch 25, the bolt 38 is adjusted outwardly to clear its inner end from the end of bar 30. Then the free end of the bar is lifted to clear it from the abutment 35 and is pulled outwardly, and incident to this, the head 31 disengages the latch 25 and the latter swings clear of the latch plate flange 21 and the stake S, thus released, swings outwardly and downwardly to the log releasing position.

Due to the fact that the outer end of bar 30 when secured by bolt 38 becomes tightly wedged against the abutment plate 35, it is sometimes required that it be pried free. For this purpose I have provided a pry rod 40 which can be conveniently carried in the end of the bunk by projecting it through aligned holes in the plate 39 and a plate 35 and into the bar 30. To retain the pry rod against loss when so disposed, it is formed with a laterally directed U-shaped end portion 40x, shown in FIG. 4, which can be swung to a position embracing the outer end portion of bar 39 and thus the bar will be held against endwise movement. However, it can be swung upwardly to clear bar 39 for easy removal. To use this pry bar, it is removed from its secured position and extended across the bar 39, serving as a fulcrum, and its inner end engaged with a strap 48 across the outer end of bar 30. Downward pressure against its outer end will lift its inner end and free the end of the bar 30 from the stop 35.

When the log retaining stakes S—S are in log holding position, as in FIG. 2, they will retain the load and all slack in the parts will be taken up by the pressure of logs outwardly against the stakes. However, if a truck is running empty, it is then required that the slack be taken up by other means. Therefore, plates as shown at 50 in FIGS. 2 and 3 are fixed in the ends of the channel members 10 at their stake mounting ends, and set screws 51 are threaded through the outer face plate of the bunks which may be tightened agains the plaes 50 and then secured by lock nuts 52, thus to eliminate the rattle and looseness otherwise noted.

It is to be understood that the two paired and cooperatively arranged bunks B and B' are joined face to face by welding or by other suitable means and that, as mounted by the king pin K the unit can pivot as may be required for highway operation. The bunks are supported on the base structure F through the usual wear plates as shown in FIG. 2.

There are times when it is desirable to haul logs of large diameter. In such cases, it is practical to remove the stakes S—S' from the bunk ends and to utilize the latch members 25, as has been shown in FIG. 7, to retain outside logs of small diameter and to dispose the log of large diameter between them. To so adapt the truck for large log transportation it is required only that the bolts 18 be withdrawn and the stakes S and S' removed.

What I claim as new is:

1. A logging truck of the character described comprising a transversely disposed logging bunk and pivotably mounted stakes at opposite ends of said bunk, said bunk including spaced, parallel opposite sidewalls, a top wall and a bottom wall joining said sidewalls into a box-like structure, a stake mounting pin for each stake extending through the lower end of said stake and between and through said sidewalls of the bunk adjacent the bottom wall and adjacent the outer end thereof, a pivotably mounted latching means engageable in latching relationship with each stake, a horizontal pin for mounting each latching means extending between said sidewalls, said latch pin being spaced inwardly and above said stake pin, a camming means within said bunk below said latching means, said camming means being movable into and from engagement with the peripheral surface of said latching means to prevent the downward swing movement of said latching means when said camming means is in engagement with the peripheral surface thereof, and said camming means being in engagement with the bottom wall of said bunk between said latch pin and said stake pin whereby the outward swinging forces on said stake are transmitted from said stake through the latching means and camming means to said bottom wall of the bunk when said stake is in upright position and in engagement with said latching means.

2. A logging truck as in claim 1 wherein said stake mounting pin is disposed outwardly of the vertical center line of the stake when the stake is in raised position.

3. A logging truck as in claim 1 wherein pressure means is provided for retaining said stake in engagement with said latching means.

4. A logging truck as in claim 1 wherein the stakes at opposite ends of the bunk are offset from the longitudinal center line of the bunk.

5. A logging truck as in claim 1 including cam actuating means extending to the opposite end of the bunk.

6. A logging truck as in claim 1 wherein said stakes are bifurcated at the lower end thereof and straddle the bunk.

(References on following page)

References Cited in the file of this patent

UNITED STATES PATENTS

| | | |
|---|---|---|
| 416,128 | Thompson | Nov. 26, 1889 |
| 1,072,516 | Shields | Sept. 9, 1913 |
| 1,256,860 | Yerk | Feb. 19, 1918 |
| 1,550,984 | Ralph | Aug. 25, 1925 |
| 2,469,023 | White | May 3, 1949 |
| 2,469,760 | Berry | May 10, 1949 |
| 2,700,552 | Query | Jan. 25, 1955 |
| 2,828,140 | Hassell | Mar. 25, 1958 |
| 2,869,894 | Messler | Jan. 20, 1959 |

FOREIGN PATENTS

| | | |
|---|---|---|
| 462,432 | Canada | Jan. 17, 1950 |